(Model.)

A. VESTER.
FLAT CHAIN.

No. 298,432. Patented May 13, 1884.

WITNESSES,
George B. Barrows
James O. Hern

INVENTOR,
Adolph Vester
By Walter B. Vincent Atty.

UNITED STATES PATENT OFFICE.

ADOLPH VESTER, OF PROVIDENCE, RHODE ISLAND.

FLAT CHAIN.

SPECIFICATION forming part of Letters Patent No. 298,432, dated May 13, 1884.

Application filed June 25, 1883. (Model.)

*To all whom it may concern:*

Be it known that I, ADOLPH VESTER, of Providence, in the State of Rhode Island, have made certain new and useful Improvements in Flat Chains; and I do hereby declare that the following specification, taken in connection with the drawings making a part of the same, is a full, clear, and exact description thereof.

Figure 1:
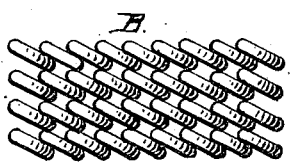
Figure 3:
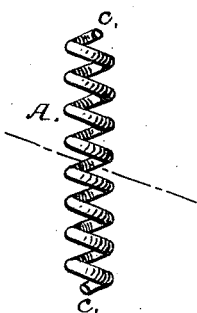
Figure 5:
Figure 2:
Figure 4:

Figure 1 shows the flat side or surface of the chain. Fig. 2 is an edge view of the same. Fig. 3 is a spirally-formed wire. Fig. 4 is an edge view of chain now in use. Fig. 5 is an edge view of my improved chain.

The object of my invention is to produce a chain which shall be more durable than those now in use and at the same time more pleasing to the eye; and it consists in the finishing of the edges thereof, as hereinafter described.

Chains of this class are made from spirally-formed wire, which is separated into lengths according to the width of the chain to be made. A piece of such wire, A, Fig. 3, comprising two lengths, is shown in the drawings. After the wire has been separated into suitable lengths they are interwoven or entwined one with another until a chain of the required length is produced, as shown at B, Fig. 1. The edges of the chain thus formed are rough and ragged on account of the protruding ends *c c* of the spirals, as shown in Fig. 2.

To finish and make smooth the edges, it has heretofore been the invariable practice to fill or cover them with solder and subsequently file the whole down to a smooth surface, as shown in Fig. 4.

The great majority of these chains are made from "rolled plate," so called—that is, from wire having an exterior surface of gold—and it will be readily seen that the subsequent filing referred to will leave an edge composed of solder and the baser metal, which is not only of a different color, but soon tarnishes and turns black, while the remainder of the chain remains bright.

In my invention, instead of filling or daubing the edges with solder and subsequently filing them down, I roll down, by means of a suitable roller, the ragged ends or points of the wire to a uniform position, as shown in Fig. 5. The chain is run between the rollers in such a manner as to compress the edges only when it is not desired to affect the body of the chain.

Chains have been compressed flatwise heretofore; but I am not aware that the edges have been compressed to get rid of the ragged ends until my invention for doing so.

Although not necessary, the ends or points of the wire may be lightly touched with solder, if desired, before the rolling process sufficient to secure the turned-over points, but without injuriously affecting the appearance of the chain.

In finishing the edges in the manner described it will be readily seen that the metal remains intact and that the plating is neither destroyed nor damaged, and that the edges will present the same bright and finished appearance, and will be of the same color as the rest of the chain.

What I claim as my invention, and desire to secure by Letters Patent, is—

The method herein described of making and finishing flat chains, consisting of interlacing or intertwining suitable lengths of spirally-formed wire and subsequently finishing the edges thereof by compressing the protruding ends of such wire to a uniform position against the coils of the chain, in the manner and for the purposes substantially as specified.

ADOLPH VESTER.

Witnesses:
WALTER B. VINCENT,
JAMES O. HERN.